Feb. 4, 1958  H. DEGLER  2,821,813
MACHINE FOR THE PRODUCTION OF A PARABOLOIDAL BODY
Filed May 28, 1957  5 Sheets-Sheet 1

Feb. 4, 1958  H. DEGLER  2,821,813
MACHINE FOR THE PRODUCTION OF A PARABOLOIDAL BODY
Filed May 28, 1957  5 Sheets-Sheet 2

Feb. 4, 1958 H. DEGLER 2,821,813
MACHINE FOR THE PRODUCTION OF A PARABOLOIDAL BODY

Filed May 28, 1957 5 Sheets-Sheet 3

Feb. 4, 1958  H. DEGLER  2,821,813
MACHINE FOR THE PRODUCTION OF A PARABOLOIDAL BODY
Filed May 28, 1957  5 Sheets-Sheet 4

United States Patent Office 2,821,813
Patented Feb. 4, 1958

2,821,813
MACHINE FOR THE PRODUCTION OF A PARABOLOIDAL BODY

Heinrich Degler, Zollikon, Zurich, Switzerland, assignor to Albiswerk Zurich A. G., Zurich, Switzerland, a Swiss corporation Application May 28, 1957, Serial No. 662,108
Claims priority, application Switzerland June 28, 1956
18 Claims. (Cl. 51—2)

My invention relates to a machine tool for producing a rotational paraboloid from a pre-shaped workpiece such as a casting or molded blank. The terms "rotational paraboloid" mean a rotationally symmetrical convex body whose meridian sections are defined by identical parabolic arcs.

Paraboloidal bodies are used, for example, as optical lenses, as a carrier of convex parabolic mirrors, or as matrices for the production of concave parabolic mirrors. Parabolic matrices of metal are preferred for the pressing of parabolic mirrors from sheet metal. Parabolic matrices of glass, or of more readily fabricated waxes and resins, are employed for the manufacture of parabolic mirrors, by the galvano-plastic method. The galvano-plastic method consists in coating a parabolic matrix within a galvanic bath with at least one metallic coating, the matrix being covered with an electrically conducting, preferably highly reflecttive, film. The metallic coating is subsequently pulled off the matrix. In this manner, parabolic mirrors of optically high-quality can be produced which are superior to glass mirrors, because of their smaller weight and higher resistance to breaking.

Heretofore, the manufacture of accurate paraboloidal bodies, as used for the matrices, has been intricate and time-consuming, with the available machines. In many cases the latter required extremely great manual skill. Most of the machines available for such purposes must be provided with a stencil or template corresponding to the paraboloid to be produced, and such a template must satisfy extremely exacting requirements with respect to accuracy of shape and measurements. Another type of machine does not require a template, but involves complicated mechanisms for controlling the tool motions. In this case, the tool touches the workpiece practically only at a single point. This calls for control means which accurately determine the position of the point of contact in two directions, namely, with respect to the height above the base surface of the paraboloid, and with respect to the distance from the symmetry axis of the paraboloid. Due to the point-shaped contact with the workpiece, the tool is subjected to relatively great and rapid wear at that point, thus often making it doubtful whether the desired accuracy of measurements is being achieved.

It is an object of my invention to avoid the above-mentioned disadvantages.

To this end, and in accordance with a feature of my invention, I provide a machine tool for producing a parabolidal body with a rotatable carrier for concentrically mounting the workpiece to be machine, and I further provide at least two guide elements or rails that extend parallel to respective mutually intersecting tangents of a geometrically extended parabolic meridian of the paraboloid to be produced. I further mount two members such as sliders, for example, displaceable longitudinally on the respective guides or rails and I interconnect the two sliders, or members, by a tool holder bar which is pivotally linked to one slider and displaceably linked with the other slider so as to be capable of longitudinal displacement relative to the other slider. The machining tool proper is mounted on the holder bar, with its length or machining path parallel to the direction of the holder bar. The tool is of such minimum length that it maintains tangential contact with the workpiece relative to or in the meridian curve to be machined at a time. I further interconnect the two sliders, or longitudinally movable members, by a common driving mechanism which simultaneously displaces the sliders at equal speeds in mutually opposed directions relative to the above-mentioned intersection point of the two tangents.

This mechanism or linkage for guiding the tool is simple, in comparison with the machines previously used for such purposes. The tool control mechanism is based, in principle, upon a known geometrical property of parabolas. The parabolic arc is constructed by first setting up two mutually intersecting tangents of the parabola to be produced, and then displacing a straight line, which intersects both tangents. This displacement is carried out in such a manner that the sum of the distances of the two intersections of the straight line from the intersection point of the two tangents is constant.

The above-mentioned and other more specific objects and features of my invention will be apparent from the preferred embodiments illustrated on the drawings, in which.

The same reference numerals are used in the illustrations for similar components.

Figure 1:
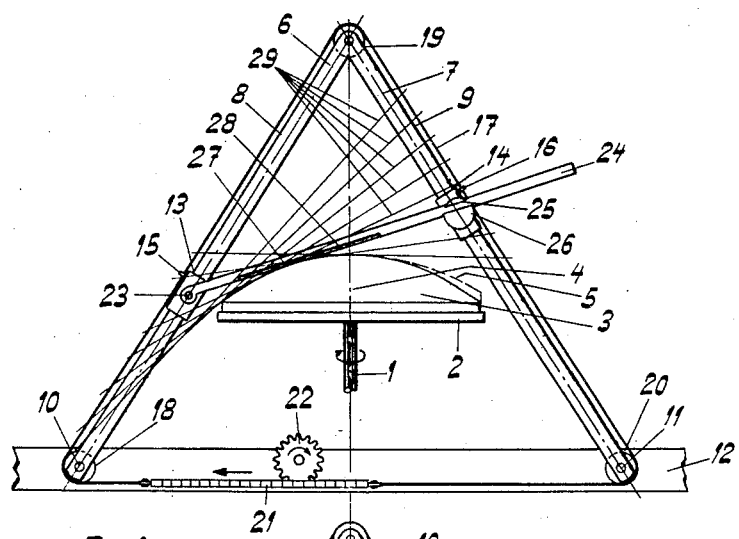
Fig. 1 is a front view of a first embodiment of a machine tool according to the invention.

According to Fig. 1, a pre-shaped workpiece 3, such as a casting or molded body, is mounted on a supporting disc 2 which during operation of the machine is kept in rotation by means of a drive shaft 1. The original shape of the workpiece 3 is indicated on the right-hand side of the symmetry axis 4 by a broken line 5. The workpiece 3 consists of a material of a hardness less than glass, so that it can be fabricated by means of cutting tools. Two guide rails 8 and 9, extending parallel to respective tangents 6 and 7 represented by dot-and-dash lines, have one of their respective ends linked to each other. The other ends of the guide rails 8 and 9 are fastened by means of pivot pins 10 and 11 to a base plate 12.

Displaceably mounted on the guide rail 8 is a slider 13. Another slider 14 is displaceably mounted on guide rail 9. The sliders 13 and 14 have respective projections 15 and 16 connected with a steel tape 17 which passes over freely revolving rollers 18, 19 and 20. The two ends of the steel tape 17 are fastened to the respective ends of a roller chain 21. A sprocket gear 22 meshing with the roller chain moves the roller chain 21, and thus the steel tape 17, by means of a feed drive (not illustrated) operating upon the shaft of the sprocket gear.

Slider 13 carries a pivot pin 23 on which a holder bar 24 is rotatably mounted. Slider 14 carries a rotatable disc 26 which has a groove 25 straddling the holder bar 24 so that the bar can slide in groove 25 only in the longitudinal direction of the bar. The holder bar 24 is provided with a cutting tool 27 whose cutting edge 28 extends along the direction of the holder bar, preferably in alignment with pivot 23. The operation of the machine will be explained presently with reference to auxiliary lines 29. The holder bar 24 is initially positioned so that the cutting tool 27 is located laterally of the rotating workpiece 3, without touching the latter. The roller chain 21 and the steel tape 17 are then moved in the direction of the arrow. As a result, the cutting tool 27 is lowered onto the workpiece 3 and, during further motion of the steel tape 17, follows a meridian line or arc of the paraboloid to be produced. The auxiliary lines 29 represent a family of tangents relative to the meridian line just mentioned. The length of the cutting tool 27 need not necessarily correspond to the length of the meridian arc to be followed, because the cutting tool is rigidly fastened to the holder bar 24 and is guided by the bar toward the symmetry axis 4 of the workpiece 3. During such tool travel, there occurs, additionally, a rolling movement of the cutting tool 27 relative to the workpiece 3. This is so because the longitudinal displacement of the left end of the holder bar 24 is linear, because of the straight guide bar 8, whereas the meridian arc represents a square function. These geometric facts are particularly favorable with respect to the dimensioning of the tools used in the embodiments subsequently described. When the tool cutting edge or surface is perpendicular to the workpiece axis 1 it is equidistant from the two sliders.

Figure 2:
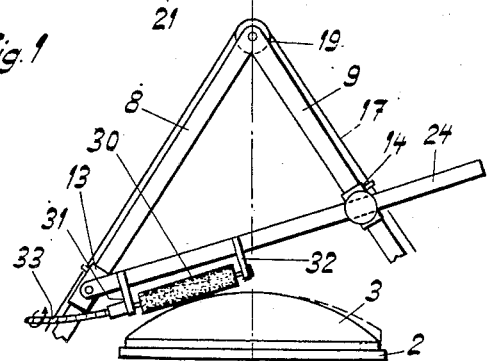
Fig. 2 is a partial front view of a second embodiment, employing a grinding or milling roller or cylinder.

Instead of the cutting tool 27 of Fig. 1, the embodiment illustrated in Fig. 2 is provided with a grinding roller 30 of abrasive material. With a grinding roller of sufficient hardness, it is also possible to machine such hard materials as glass. The axis of the grinding roller 30 extends parallel to the holder bar 24. The grinding roller 30 is journalled on two brackets 31 and 32 mounted on the holder bar 24 and is placed in rotation through a flexible shaft 33 from a suitable drive (not illustrated). The other components of the machine, partly omitted in Fig. 2, correspond to those described above with reference to Fig. 1. The guiding means for the grinding roller 30 also correspond to those of the cutting tool 27 in Fig. 1. For machining a workpiece of metal, it may be of advantage to use a different machining tool such as a roller-shaped milling cutter with helical teeth. Element 30 may therefore also be interpreted as representative of a cylindrical milling cutter with helical teeth whose axis is parallel to the holder bar and which is connected to the rotating shaft 33. Analogously, for finishing or polishing the workpiece, a roller with a cloth or felt cover may be used.

Figure 3:
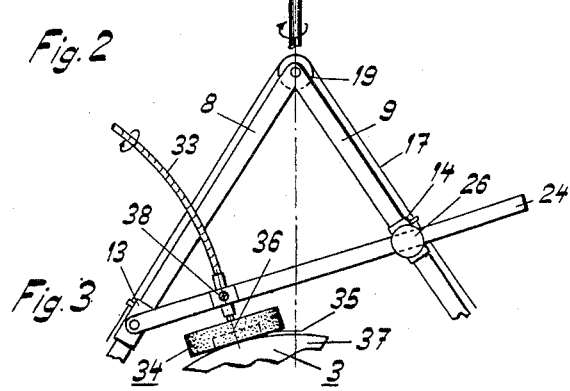
Fig. 3 illustrates a partial front view of a third embodiment, employing a grinding disc.
Figure 4:
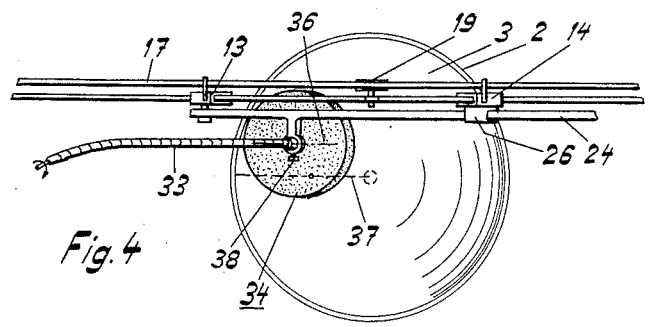
Fig. 4 is a top view of the machine shown in Fig. 3.

In the embodiment according to Figs. 3 and 4, a grinding disc 34 serves as the material-removing tool. The front face 35 directed toward the workpiece 3 extends parallel to the holder bar 24. The shaft 36 of the grinding disc 34 is located outside of the meridian arc 37 to be covered by the machining operation. The position of the grinding disc as regards its spacing from the holder bar 24 is fixed or adjusted by means of a set screw 38. Upon loosening the set screw 38, the disc 34 can be displaced in order to gradually adjust it so as to have the active surface of the grinder disc approach or move along the meridian arc of the paraboloid to be produced. The disc 34 is driven by a flexible shaft 33 from a suitable drive (not illustrated). For the performance of different fabricating operations, the grinding disc 34 may be replaced by a frontal milling tool, or a cloth, or felt-coated polishing disc.

Figure 5:
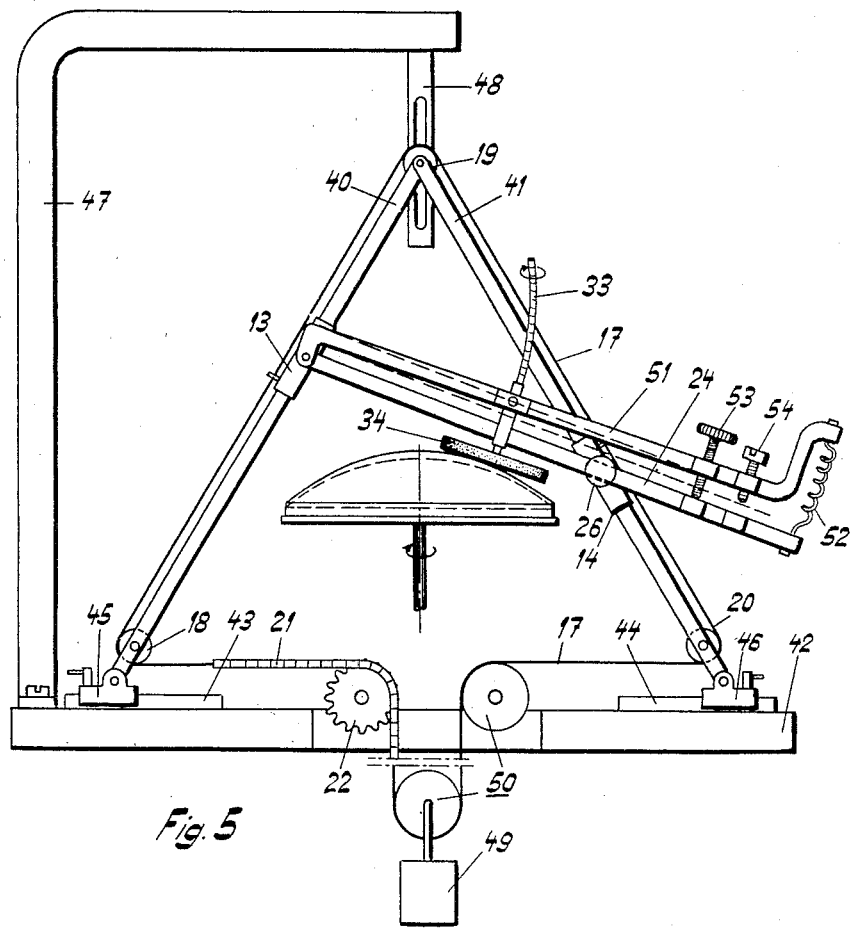
Fig. 5 is a front view of a fourth embodiment, illustrating a mechanism adjustable to make paraboloids having different meridian arcs.

The embodiment according to Fig. 5 is suitable for the selective manufacture of paraboloids of respectively different dimensions. It differs from the embodiment according to Fig. 3 mainly by the fact that it possesses guide rails 40 and 41 that can be adjusted to respectively different paraboloidal meridian arcs. The base plate 42 of the machine carries tool slide rails 43 and 44 upon which respective adjusting sliders 45 and 46 are displaceably mounted. The sliders 45 and 46 are provided with a slot on their lower faces for this purpose. A support 47 is provided for increasing the stability of the guide rails 40 and 41. The support carries a vertical guide bar 48 which has a slot traversed by the pivot pin joining the guide rails 40 and 41. The mutual distance to be adjusted between the foot points, that is, the lower ends, of respective guide rails 40 and 41 can be calculated from the equation of the desired meridian line. To permit such adjustment of the guide rails, the steel tape 17 is guided about a pulley 50 provided with a tensioning weight 49. Instead of the pulley 50, a spring-actuated tensioning device, such as is customary for such purposes, may be used.

Another difference of this embodiment from that of Fig. 3 is the fact that an auxiliary bar 51 is provided for adjusting the elevation of the grinding disc 34. The auxiliary bar 51 carries the bearing for journalling the shaft of the grinding disc 34. One end of the auxiliary bar 51 is pivotally joined with the holder bar 24 and has its other end braced against the holder bar 24 under the pull of a helical spring 52, an adjusting spindle 53 with a knurled head being provided as an abutment. The position, indicated by broken lines, which the auxiliary bar 51 is to occupy at the end of a machining operation, can be predetermined by means of a set screw 54. Set screw 54 may be provided with a marker to indicate when it is set to ultimately position bar 51 parallel to bar 24. By repeated adjustment of the spindle 53 prior to each individual operating run, the machining path of the grinding disc 34 can be made to stepwise approach the desired meridian curve.

Figure 6:
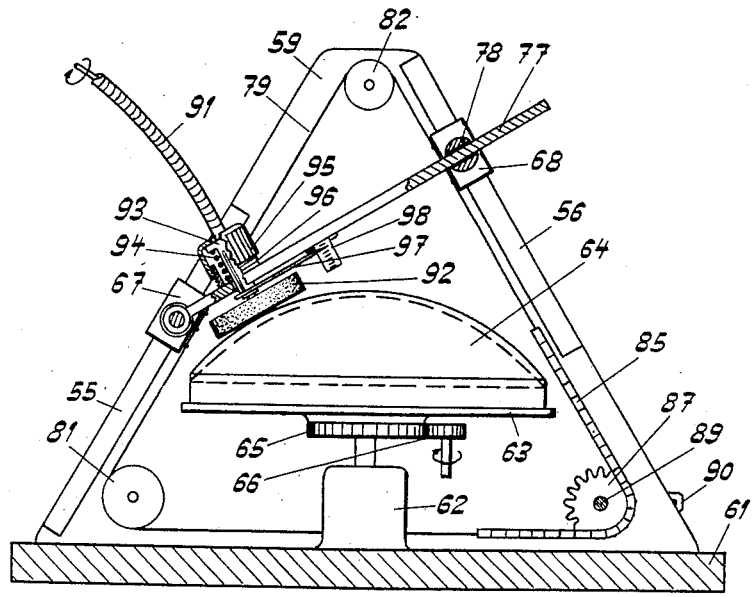
Fig. 6 is a front view, partly in section, of a fifth embodiment, the section being taken along the line VI—VI in Fig. 7.
Figure 7:
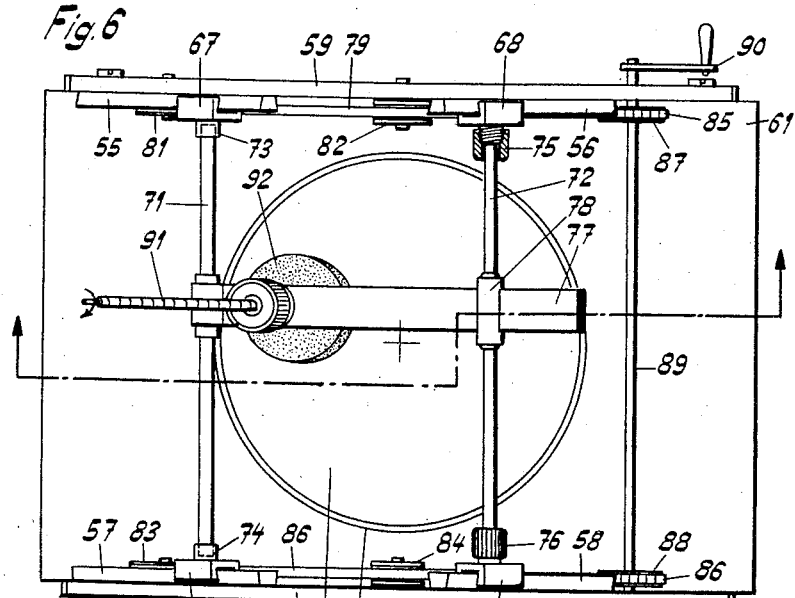
Fig. 7 is a top view of the machine of Fig. 6; this machine has a modified tool support structure.

The machine illustrated in Figs. 6 and 7 is provided with two parallel pairs of guide rails 55, 56 and 57, 58 for the purpose of increasing the rigidity and stability of the stationary machine structure. The pairs of guide rails are mounted on two lateral plates 59 and 60, firmly joined with a base plate 61. The base plate 61 also carries a bearing 62 for the carrier disc 63 on which the pre-shaped workpiece 64 is securely mounted. The rotatable carrier disc 63 is driven from the machine drive through spur gears 65 and 66.

Each of the guide rails 55 to 58 is provided with a slider designated 67, 68, 69 or 70. The mutually opposite sliders 67 and 69 are interconnected by a supporting rod 71, and a similar supporting rod 72 interconnects the sliders 68 and 70. The rod 71 sits rotatably but nonremovably in bearings 73 and 74 on the respective sliders 67 and 69, whereas the rod 72 is joined by threaded sleeve nuts 75 and 76 with the respective sliders 68 and 70. A holder bar 77 is pivotally connected with the supporting rod 71 and passes through a slot in a bearing piece 78 mounted on the supporting rod 72 which rod, for this purpose, is preferably composed of two aligned pieces located on or in opposite sides respectively of the rotatable bearing member 78.

The sliders 67 through 70 are driven in the manner described with reference to the foregoing embodiments, with the aid of a pair of steel tapes 79 and 80 passing over freely revolvable rollers 81, 82 and 83, 84. The two ends of each steel tape 79, 80 are connected to a roller chain 85 or 86 in meshing engagement with a sprocket 87 or 88. The two sprockets 87 and 88 are mounted on a shaft 89 which can be rotated by means of a hand crank 90. Mounted on the holder bar 77 is a material-removing tool shown as a grinding disc 92. The tool is driven through a flexible shaft 91 and is journalled for rotation in a bearing sleeve 93 which is braced against a cap nut 95 under the pressure of a spring 94. The cap nut 95 is in threaded engagement with a hollow cylindrical nipple 96 firmly joined with the holder bar 77. By turning the cap nut 95, the grinding disc 92 can be adjusted in respect to its height relative to the workpiece, for the purpose of having the tool approach the desired meridian step by step.

The adjustment in height is indicated by means of a pointer 97 fastened to the sleeve 93 and coacting with an indicating scale 98. As in the other embodiments, the grinding disc 92 may be replaced by one of the above-mentioned cutting, finishing or polishing tools.

Machines according to the invention can be modified in various respects. The control of the slider motion can be effected by transmission means other than the illustrated steep tapes. Instead of the illustrated roller chains, other transmission members such as racks, screw-spindles, or lever mechanisms may be used.

Figure 8:
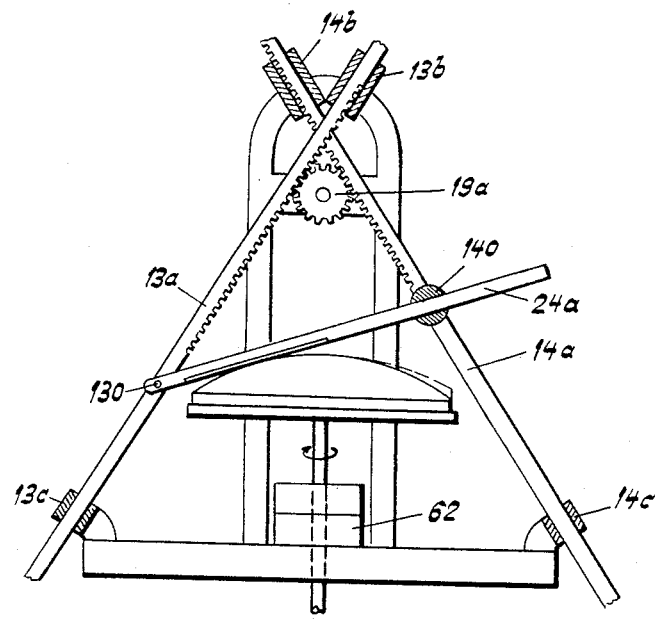
Fig. 8 is an elevation, partly in section, and in schematic view, of another embodiment, in which moving rack bars are used to coordinate the movement of the opposite ends of the tool holding bar.

For example, in the embodiment according to Fig. 1, the roller 19 may be replaced by a pinion gear meshing with a rack that extends in the longitudinal direction of the guide bar 8 and also with a rack that extends in the direction of the guide rail 9. Each rack in this modification is connected with one of the respective members 13 and 14. When one of the racks is moved in one direction, the other rack is constrainedly moved in the opposite direction. This is illustrated diagrammatically in Fig. 8, in which two rack geared bars 13a and 14a move on the same pinion gear 19a. The rack bars slide in preferably fixed upper sleeves 13b and 14b and in preferably fixed lower sleeves 13c and 14c. However, adjustability can be obtained by employing moveable supports for the rack bars analogously to Fig. 5. The work support is indicated at 62, in Fig. 8. The tool holder bar 24a is hinged to rack 13a at pivot 130 and slides lengthwise in swivel 140, pivoted on rack 14a.

Figure 9:
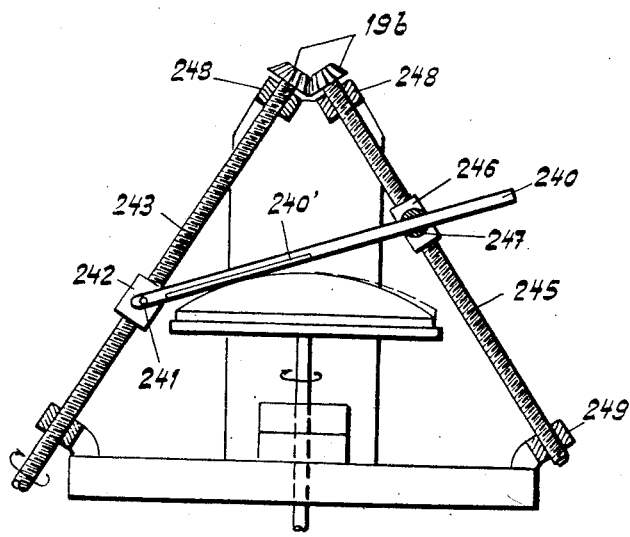
Fig. 9 is an elevation, partly in section, of still another embodiment, in which the sliders of Fig. 1 have been replaced by blocks moving along rotary screw spindles connected through a bevel gear.

In another example, two screw spindles can be mounted parallel to each of guide rails 8 and 9. The power transmission from a screw spindle can be effected by means of bevel gears mounted in the vicinity of the intersection point of the guide rails 8 and 9. Each screw spindle may be surrounded by a threaded nut connected with one of the respective members 13 and 14. In this case again, the required mutually opposed motion of the members 13 and 14, when driving one of the threaded spindles, is secured. This is schematically illustrated in Fig. 9. The holder bar 240 carries the tool 240'. The bar is pivoted at 241 on an internally threaded block 242 which moves along spindle screw 243. Spindle 243 is turned by means of a crank arm (not shown). This causes bevel gears 19b to turn spindle screw 245, which is oppositely threaded with respect to spindle 243. Internally threaded block 246 is thus caused to move downwardly, along spindle 245, while block 242 moves upwardly at the same speed. The holder bar 240 is free to slide lengthwise in a groove or bore in swivel member 247, which pivots on block 246. The spindles are free to turn in supporting sleeves 248, 249.

Figure 10:
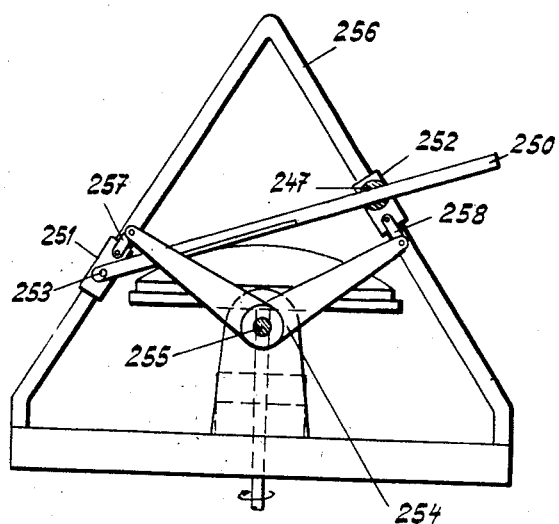
Figs. 10 and 11 illustrate a further embodiment, in which the sliders of Fig. 1 are conjointly moved in opposite directions by means of an oscillatable lever linkage.

A similar result can be obtained by means of a lever pivoted about a fixed fulcrum and coupled with the sliders 13 and 14. This is schematically illustrated in Fig. 10. The holder bar 250 for the tool is pivoted on slider 251 and is free to reciprocate in slider 252. When lever 254 is oscillated about pivot 255, slider 251 moves upwardly while slider 252 moves downwardly, or vice versa. The lever is linked to the sliders through arms 257 and 258 pivoted on both. The sliders move along V-shaped rod 256. The pivot 255 is on the line bisecting the angle of the V.

Figure 11:
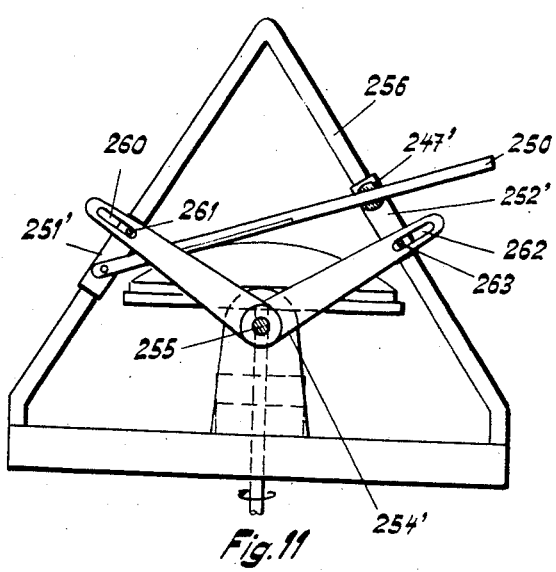

The knee levers or arms 257, 258 of Fig. 10 may be replaced by pin-and-slot connections 260, 261, and 262, 263, shown in Fig. 11. The lever 254' moves sliders 251' upwardly and slider 252' downwardly, and vice versa. The tool holder bar 250 is pivoted on slider 251' and is free to slide in swivel 247'.

The embodiments illustrated in Figs. 10 and 11 are readily made of rigid construction, thus permitting the production of paraboloid pieces of highest precision.

All of the refinements shown in Figs. 2 to 7 can be employed in conjunction with the embodiments illustrated in Figs. 1, 10, and 11. For example, it is within the purpose of the invention to substitute the tools and tool holder bar structures shown in Figs. 2 to 7 for that illustrated in Figs. 9, 10, and 11. The adjustable support structure of Fig. 5 can be adapted to Figs. 9, 10, and 11.

Although the apparatus described has, as one important utility, the manufacture of paraboloidal bodies, it can be adapted to the making of bodies of other curved outlines, by modifying the position and angle of the cutting tool, disc, or cylinder, by imparting different speeds of movement to the sliders, for example by employing spindles having threads of different pitch in Fig. 9, or by modification of the angle and the relative arm lengths of the two guide elements.

I claim:

1. A machine tool for producing a paraboloidal body, comprising a rotatable carrier for concentrically mounting a workpiece to be machined, at least two guide elements extending parallel to respective mutually intersecting tangents of an extended parabolic meridian of the paraboloid to be produced, two members displaceable lengthwise on said respective guide elements, a holder bar pivotally linked to one of said members and displaceably linked to said other members for displacement in the longitudinal direction of the bar, a tool mounted on said holder bar and having a workpiece machining path parallel to the bar direction and of such minimum length as to maintain contact with the workpiece tangentially to the meridian curve to be covered, and means for simultaneously displacing the two members along said respective guide elements at equal speeds in mutually opposed directions relative to the intersection of said tangents.

2. The apparatus described in claim 1, a bearing mounted on said holder bar, said tool being rotatably mounted in the bearing, and means for rotating the tool.

3. A machine tool for producing a paraboloidal body, comprising a rotatable carrier for concentrically mounting a workpiece to be machined, at least two guide rails extending parallel to the respective mutually intersecting tangents of an extended parabolic meridian of the paraboloid to be produced, two sliders displaceable lengthwise on said respective rails, a holder bar pivotally linked to one of said sliders and displaceably linked to said other slider for displacement in the longitudinal direction of the bar, a tool mounted on said holder bar and having a workpiece machining path positionable parallel to the bar direction and of such minimum length as to maintain contact with the workpiece tangentially to the meridian curve to be covered, and a driving transmission means interconnecting said two sliders for simultaneously displacing them along said respective rails at equal speeds in mutually opposed directions relative to the intersection of said tangents.

4. The apparatus described in claim 3 in which the transmission means comprises an endless band connecting the two sliders, and means supporting the band for movement thereof along the two guide rails.

5. The apparatus described in claim 3 in which the transmission means comprises an endless band, the band comprising a steel tape and a sprocket chain connected thereto, a driving sprocket for the chain, and means supporting the band for movement along the two guide rails.

6. A machine tool for producing a paraboloidal body, comprising a rotatable carrier for concentrically mounting a workpiece to be machined, at least two guide elements extending parallel to respective mutually intersecting tangents of an extended parabolic meridian of the paraboloid to be produced, two members displaceable lengthwise on said respective guide elements, a holder bar pivotally linked to one of said members and displaceably linked to said other member for displacement in the longitudinal direction of the bar, a tool mounted on said holder bar and having a workpiece machining path positionable parallel to the bar direction and of such minimum length as to maintain contact with the workpiece tangentially to the meridian curve to be covered, means for simultaneously displacing the two members along said respective guide elements at equal speeds in mutually opposed directions relative to the intersection of said tangents, and a supporting structure for the two guide elements, the guide elements being connected to the supporting structure by adjustable means determining the angle between them to obtain different tangents corresponding to parabolas having different meridians.

7. A machine tool for producing a paraboloidal body, comprising a rotatable carrier for concentrically mounting a workpiece to be machined, at least two guide rails extending parallel to respective mutually intersecting tangents of an extended parabolic meridian of the paraboliod to be produced, two sliders displaceable lengthwise on said respective rails, a holder bar pivotally linked to one of said sliders and displaceably linked to said other slider for displacement in the longitudinal direction of the bar, a tool mounted on said holder bar and having a workpiece machining path positionable parallel to the bar direction and of such minimum length as to always contact the workpiece tangentially to the meridian curve to be covered, a driving transmission means comprising an endless band interconnecting said two sliders for simultaneously displacing them along said respective rails at equal speeds in mutually opposed directions relative to the intersection of said tangents, and a supporting structure for the two guide rails, the rails being connected to the supporting structure by adjustable means determining the angle between them to obtain different tangents corresponding to parabolas having different meridians.

8. A machine tool for producing a paraboloidal body, comprising a rotatable carrier for concentrically mounting a workpiece to be machined, two parallel pairs of guide rails extending parallel to respective mutually intersecting tangents of an extended parabolic meridian of the paraboloid to be produced, sliders displaceable lengthwise on each of said respective rails, a holder bar mounted between the opposite pairs of the rails, pivot means linking the holder bar to an opposed pair of the sliders, linkage means connecting the holder bar to another opposed pair of the sliders, said linkage means permitting displacement of the holder bar in the longitudinal direction of the bar, a tool mounted on said holder bar and having a machine path positionable parallel to the bar direction and of such minimum length as to always contact the workpiece tangentially to the meridian curve to be covered, and a driving transmission means interconnecting said two sliders for simultaneously displacing them along said respective rails at equal speeds in mutually opposed directions relative to the intersection of said tangents.

9. The apparatus described in claim 1 in which the tool is a cutting tool having a cutting edge which extends parallel to the holder bar and is substantially in alignment with the pivot of the holder bar and with the longitudinal displacement movement thereof.

10. The apparatus described in claim 1 in which the tool is a cylindrical milling cutter with helical teeth whose axis is parallel to the holder bar, and a drive means for rotating the cutter.

11. The apparatus described in claim 1 in which the tool is a cylindrical abrasive means having a rotational axis parallel to the holder bar, and means to rotate the tool.

12. The apparatus described in claim 1 in which the tool is a rotating tool having a flat material-removing face, said face being parallel to the holder bar, a shaft for said tool outside of the meridian arc to be covered, and means for rotating the shaft.

13. The apparatus described in claim 7, and a tensioning device to maintain the taughtness of the endless band in different positions of the said adjustable means.

14. A machine tool for producing a curved body, comprising a rotatable carrier for mounting a workpiece to be machined, at least two guide elements extending longitudinal to respective mutually intersecting tangents of an extended meridian curve of the curved surface to be produced, two members displaceable lengthwise on said respective guide elements, a holder bar structure including a holder bar pivotally linked to one of said members and displaceably linked to said other member for displacement in the longitudinal direction of the bar, a tool mounted on said holder bar structure and having a workpiece machining path positionable parallel to the bar direction and of such minimum length as to maintain contact with the workpiece tangentially to the meridian curve to be covered, and means for simultaneously displacing the two members along said respective guide elements in mutually opposed directions relative to the intersection of said tangents.

15. The apparatus described in claim 14, the holder bar structure including a lever mounted for pivoting movement with respect to the holder bar and the said one of the members in a plane parallel to the guide elements, variably settable means determining the angle between the lever and the holder bar, the tool being carried by the lever.

16. The apparatus described in claim 15, the tool being rotatably mounted on the lever, and means for rotating the tool.

17. A machine tool for producing a paraboloidal body, comprising a rotatable carrier for concentrically mounting a workpiece to be machined, at least two guide elements extending parallel to respective mutually intersecting tangents of an extended parabolic meridian of the paraboloid to be produced, two members displaceable lengthwise on said respective guide elements, a holder bar pivotally linked to one of said members and displaceably linked to said other member for displacement in the longitudinal direction of the bar, a tool rotatably mounted on said holder bar and having a workpiece machining path positionable parallel to the bar direction and of such minimum length as to maintain contact with the workpiece tangentially to the meridian curve to be covered, means for rotating the tool, means for adjusting the distance between the tool and the holder bar, and means for simultaneously displacing the two members along said respective guide elements at equal speeds in mutually opposed directions relative to the intersection of said tangents.

18. A machine tool for producing a paraboloidal body, comprising a rotatable carrier for concentrically mounting a workpiece to be machined, at least two guide elements extending parallel to respective mutually intersecting tangents of an extended parabolic merdian of the paraboloid to be produced, two members displaceable lengthwise on said respective guide elements, a holder bar structure pivotally linked to one of said members and displaceably linked to said other member for displacement in the longitudinal direction of the bar, a tool mounted on said holder bar structure and having a workpiece machining path positionable parallel to the bar displacement direction and of such minimum length as to maintain contact with the workpiece tangentially to the meridian curve to be covered, and lever means operatively connected to the two members for simultaneously displacing the two members along said respective guide elements at equal speeds in mutually opposed directions relative to the intersection of said tangents.

No references cited.